United States Patent
Mori

(10) Patent No.: US 10,129,473 B2
(45) Date of Patent: Nov. 13, 2018

(54) VIDEO RECORDING APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Kurumi Mori, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 80 days.

(21) Appl. No.: 15/165,666

(22) Filed: May 26, 2016

(65) Prior Publication Data

US 2016/0353024 A1 Dec. 1, 2016

(30) Foreign Application Priority Data

May 27, 2015 (JP) ................................. 2015-107582

(51) Int. Cl.
| | |
|---|---|
| H04N 5/94 | (2006.01) |
| H04N 5/232 | (2006.01) |
| H04N 5/77 | (2006.01) |
| G11B 27/34 | (2006.01) |
| G11B 27/36 | (2006.01) |
| H04N 9/804 | (2006.01) |

(52) U.S. Cl.
CPC ......... *H04N 5/23241* (2013.01); *G11B 27/34* (2013.01); *G11B 27/36* (2013.01); *H04N 5/772* (2013.01); *H04N 9/8042* (2013.01)

(58) Field of Classification Search
CPC .......... G11B 27/329; G11B 2220/2562; G11B 19/04; H04N 1/2112; H04N 9/8042
USPC ....................................................... 386/277
See application file for complete search history.

(56) References Cited

U.S. PATENT DOCUMENTS 6,833,866 B1* 12/2004 Suzuki ............... H04N 1/33307
348/231.2
2009/0142032 A1* 6/2009 Myokan ................. G11B 27/10
386/248

FOREIGN PATENT DOCUMENTS

JP 2010-124064 A 6/2010

* cited by examiner

*Primary Examiner* — William C Vaughn, Jr.
*Assistant Examiner* — Daniel Tekle
(74) *Attorney, Agent, or Firm* — Carter, Deluca, Farrell & Schmidt, LLP

(57) ABSTRACT

A video recording apparatus that is capable of reducing generation of error in a time code due to an auto-power-off function. A setting unit sets a count method by which a time code given to a video image is counted by selecting from among a plurality of count methods including a free run mode in which the time code is counted regardless of whether a video image is recording. A control unit controls so as to perform auto power off to turn off power when a predetermined condition, which includes a condition where there is no user's operation within a predetermined period, is satisfied in a mode other than the free run mode. The control unit controls so as not to turn off the power even when the predetermined condition is satisfied in the free run mode.

24 Claims, 6 Drawing Sheets

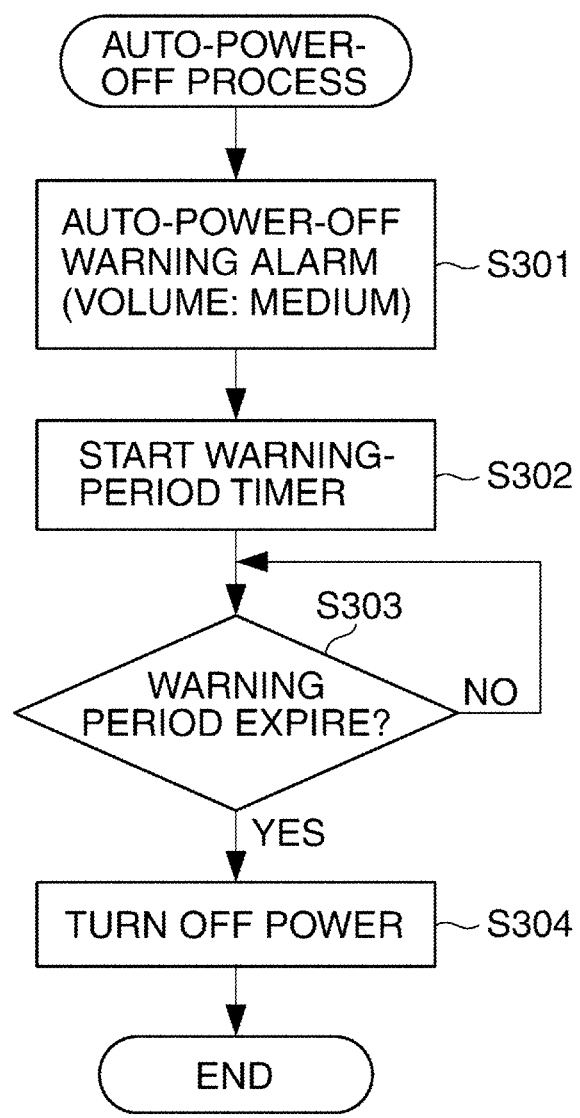

VIDEO RECORDING APPARATUS, CONTROL METHOD THEREFOR, AND STORAGE MEDIUM STORING CONTROL PROGRAM THEREFOR

BACKGROUND OF THE INVENTION

Field of the Invention

The present invention relates to a video recording apparatus that gives a time code to a video image, a control method therefor, and a storage medium storing a control program therefor.

Description of the Related Art

An electronic apparatus that is driven by a battery as a power source needs to lengthen drive time within a limited battery capacity. Accordingly, there is a known electronic apparatus equipped with an auto-power-off function that turns off the power when there is no user's operation in a predetermined period.

For example, there is an electronic apparatus that turns OFF power when a specific operation is not given within a predetermined period after turning ON the power under a setting of special auto-power-off at a timing that is earlier than a regular auto-power-off period passes (see Japanese Laid-Open Patent Publication (Kokai) No. 2010-124064 (JP 2010-124064A)). As a result of this, the electronic apparatus disclosed in this publication is trying to suppress useless battery exhaustion certainly.

On the other hand, a compact camcorder (compact video camera) of high resolution is put on a commercial scene in recent years. Particularly, a camcorder (video camera) in a category of an action cam can be installed in a place that was difficult to install until now. For example, the camcorder concerned enables unmanned photographing from the sky by installing it on a small helicopter that is remotely controlled, and enables photographing at a tire side of a car moving in a high speed. Thus, a camcorder is positively used for taking television or movies.

Furthermore, there is a usage where video images in various angles are taken with a plurality of camcorders simultaneously and these video images are collected into one video image by editing the video images. In this case, if time codes that are mutually synchronized are given to the video images taken by the camcorders, it is easy to adjust the timings of the video images at the time of editing the video images.

Incidentally, a clocking error of a clocking crystal in a power OFF state (for example, in a power OFF mode with a low frequency) becomes large as compared with the clocking error in a power ON state. As a result, when the power is turned OFF from ON, the timings of the time codes set up in the power ON state may deviate greatly due to the clocking error in the power OFF state.

Accordingly, when power of one of a plurality of photographing devices is turned OFF by the auto-power-off function disclosed in the above-mentioned publication while video images are taken with the photographing devices, the time code of the photographing device of which power is turned OFF is deviated from the time codes of the other photographing devices. As a result, when the video images obtained by the photographing devices are edited, the timings are not matched mutually.

SUMMARY OF THE INVENTION

The present invention provides a video recording apparatus, a control method therefor, and a storage medium storing a control program therefor, which is capable of reducing generation of error in a time code due to an auto-power-off function.

Accordingly, a first aspect of the present invention provides a video recording apparatus including a setting unit configured to set a count method by which a time code given to a video image is counted by selecting from among a plurality of count methods including a free run mode in which the time code is counted regardless of whether a video image is recording, and a control unit configured to control so as to perform auto power off to turn off power when a mode other than the free run mode is set up with the setting unit and when a predetermined condition, which includes a condition where there is no user's operation within a predetermined period, is satisfied, and to control so as not to turn off the power even when the predetermined condition is satisfied when the free run mode is set up with the setting unit.

Accordingly, a second aspect of the present invention provides a control method for a video recording apparatus including a setting step of setting a count method by which a time code given to a video image is counted by selecting from among a plurality of count methods including a free run mode in which the time code is counted regardless of whether a video image is recording, and a control step of controlling so as to perform auto power off to turn off power when a mode other than the free run mode is set up in the setting step and when a predetermined condition, which includes a condition where there is no user's operation within a predetermined period, is satisfied, and of controlling so as not to turn off the power even when the predetermined condition is satisfied when the free run mode is set up in the setting step.

Accordingly, a third aspect of the present invention provides a non-transitory computer-readable storage medium storing a control program causing a computer to execute the control method of the second aspect.

According to the present invention, generation of error in the time code due to the auto-power-off function is reduced.

Further features of the present invention will become apparent from the following description of exemplary embodiments with reference to the attached drawings.

BRIEF DESCRIPTION OF THE DRAWINGS

FIG. 3 is a flowchart showing an auto-power-off process executed in the step S204 in FIG. 2.

FIG. 4A shows a state where rec run is selected in the menu setting screen, and FIG. 4B shows a state where free run is selected in the menu setting screen.

DESCRIPTION OF THE EMBODIMENTS

Hereafter, video recording apparatuses of embodiments according to the present invention will be described in detail with reference to the drawings.

Figure 1:
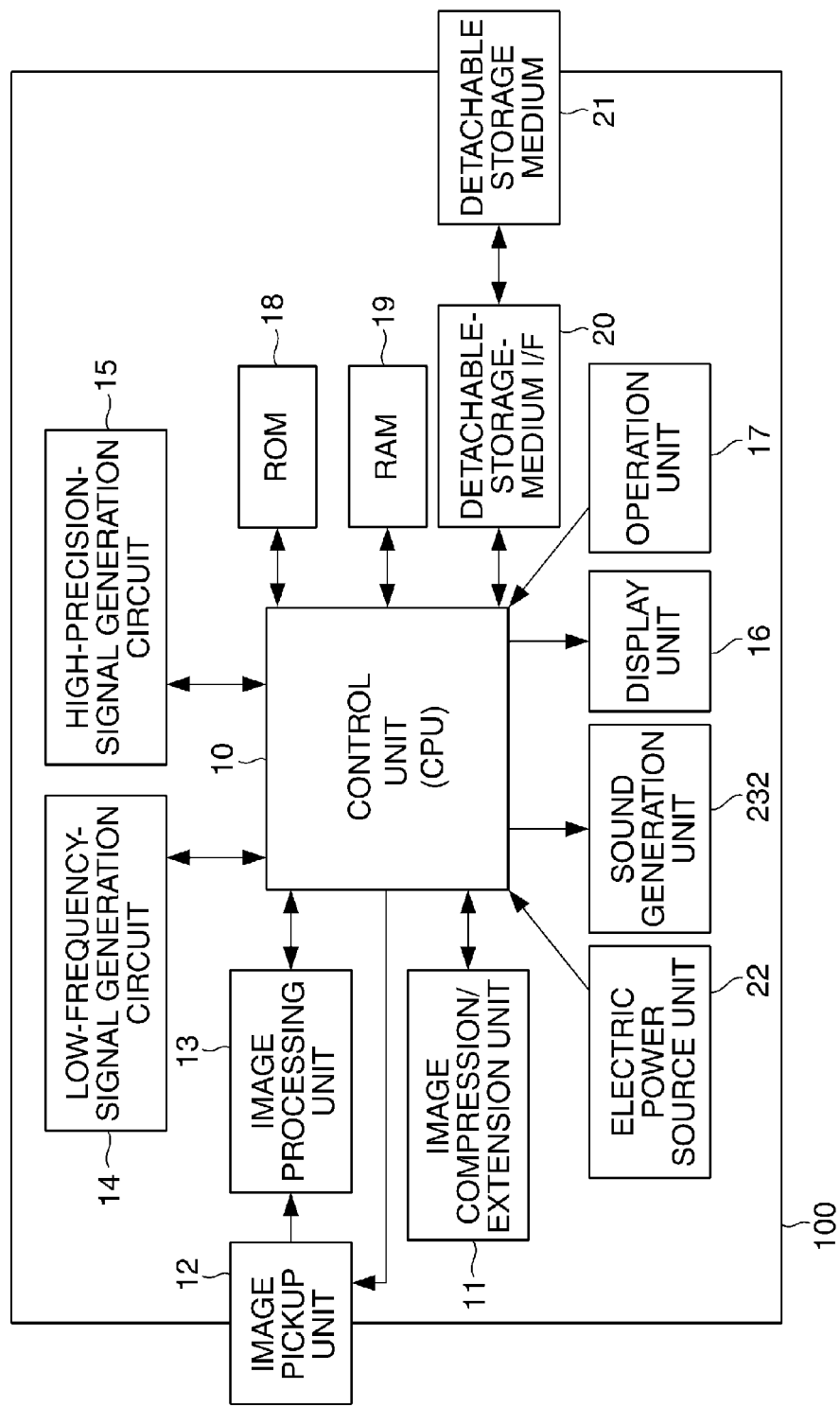
FIG. 1 is a block diagram schematically showing a configuration of a video recording apparatus (a video camera) according to a first embodiment of the present invention.

FIG. 1 is a block diagram schematically showing a configuration of a video recording apparatus according to a first embodiment of the present invention.

The illustrated video recording apparatus is a digital video camera (hereinafter referred to as a video camera, simply) 100 that has a control unit (CPU) 10. Then, an image compression/extension unit 11, image pickup unit 12, image processing unit 13, low-frequency-signal generation circuit 14, high-precision-signal generation circuit 15, display unit 16, operation unit 17, ROM 18, RAM 19, detachable-storage-medium I/F 20, electric power source unit 22, and sound generation unit 232 are connected to the control unit 10.

The control unit 10 controls the whole video camera 100. The control unit 10 controls the configuration blocks and performs processes described in flowcharts mentioned later by running programs that are recorded in the ROM 18 and are developed to the RAM 19 from the ROM 18. The ROM 18 is a writable nonvolatile storage medium in which the programs run by the control unit 10 are stored.

The RAM 19 is a volatile storage medium used as a work memory of the control unit 10. Moreover, the RAM 19 is used as a buffer when the image compression/extension unit 11 applies a compression process or an extension process to image data that is picked up with the image pickup unit 12 and is processed by the image processing 13 or image data read from the detachable storage medium 21. Furthermore, the RAM 19 is used also as a VRAM that stores image data temporarily, when displaying the image data on the display unit 16 as an image. Then, the RAM 19 is used as a memory that temporarily stores attribute information associated with the image data obtained as a result of the image pick-up.

The video camera 100 is equipped with the storage medium 21 for recording image data. The detachable-storage-medium I/F 20 is used when the video camera 100 is equipped with the storage medium 21. The detachable-storage-medium I/F 20 has a slot into which the storage media 21, such as a memory card, can be inserted.

Although the illustrated video camera 100 stores image data into the detachable storage medium 21, image data may be stored into a memory that is not detachable and is built in the video camera 100.

The image processing unit 13 obtains image data by applying image processes, such as a predetermined pixel interpolation process, resize process, and color conversion process, to the image signal obtained by the image pickup unit 12. Moreover, the image processing unit 13 performs a predetermined computing process using the image data. Then, the control unit 10 performs various controls (for example, an exposure control and an automatic white balance control) to the image pickup unit 12 on the basis of the calculated result obtained by the computing processing concerned.

The image compression/extension unit 11 performs the compression process for compressing the image data output from the image processing unit 13 and the extension process for extending the image data read from the detachable storage medium 21.

The image pickup unit 12 is provided with a photographing lens unit (a zoom lens and a focusing lens are included) and an image pickup device, such as a CCD or a CMOS sensor. The image pickup unit 12 picks up an image of an object under control of the control unit 10, and outputs image signals, such as a static image signal and a video image signal.

The display unit 16 displays a setting condition of the video camera 100, an image obtained as a result of the image pick-up by the image pickup unit 12, and an image that is read from the detachable storage medium 21 and reproduced, etc. under the control of the control unit 10. It should be noted that the display unit 16 is constituted as a display unit in a near-eye viewfinder or a variable-angle LCD monitor, for example.

The operation unit 17 receives a user's operation, and is provided with a power switch for supplying electric power to the video camera 100 and a photographing start button. Furthermore, the operation unit 17 is provided with a mode change button for switching a mode between a camera mode (photographing mode) and a reproduction mode.

The low-frequency-signal generation circuit 14 generates a low frequency clock by performing an oscillation operation at frequency that is lower than frequency of the high-precision-signal generation circuit 15 in response to a start command output after the end of a power OFF process by the control unit 10. Then, the low-frequency-signal generation circuit 14 performs a clock process at the low frequency in the power OFF state. When the electric power is turned ON, the control unit 10 obtains the clocking result from the low-frequency-signal generation circuit 14 and reflects the clocking result concerned to date information and free-run time code information that have been backed up before the power OFF.

The high-precision-signal generation circuit 15 generates a high precision signal (highly accurate clock) in response to the start command that the control unit 10 outputs after turning ON the power. Then, the control unit 10 updates the date information and the time code information on the basis of the high precision signal, and performs a synchronous process for the whole video camera 100.

The electric power source unit 22 supplies the power to each unit of the video camera 100 from the battery attached to the electric power source unit 22. The electric power source unit 22 detects a battery residue (battery residual amount) on the basis of the voltage of the battery, and notifies the control unit 10 of the battery residue concerned. Moreover, the electric power source unit 22 is able to supply the electric power from an AC power source etc. other than the battery.

The sound generation unit 232 has a loudspeaker etc. and makes an operation sound and an alarm.

Figure 2:
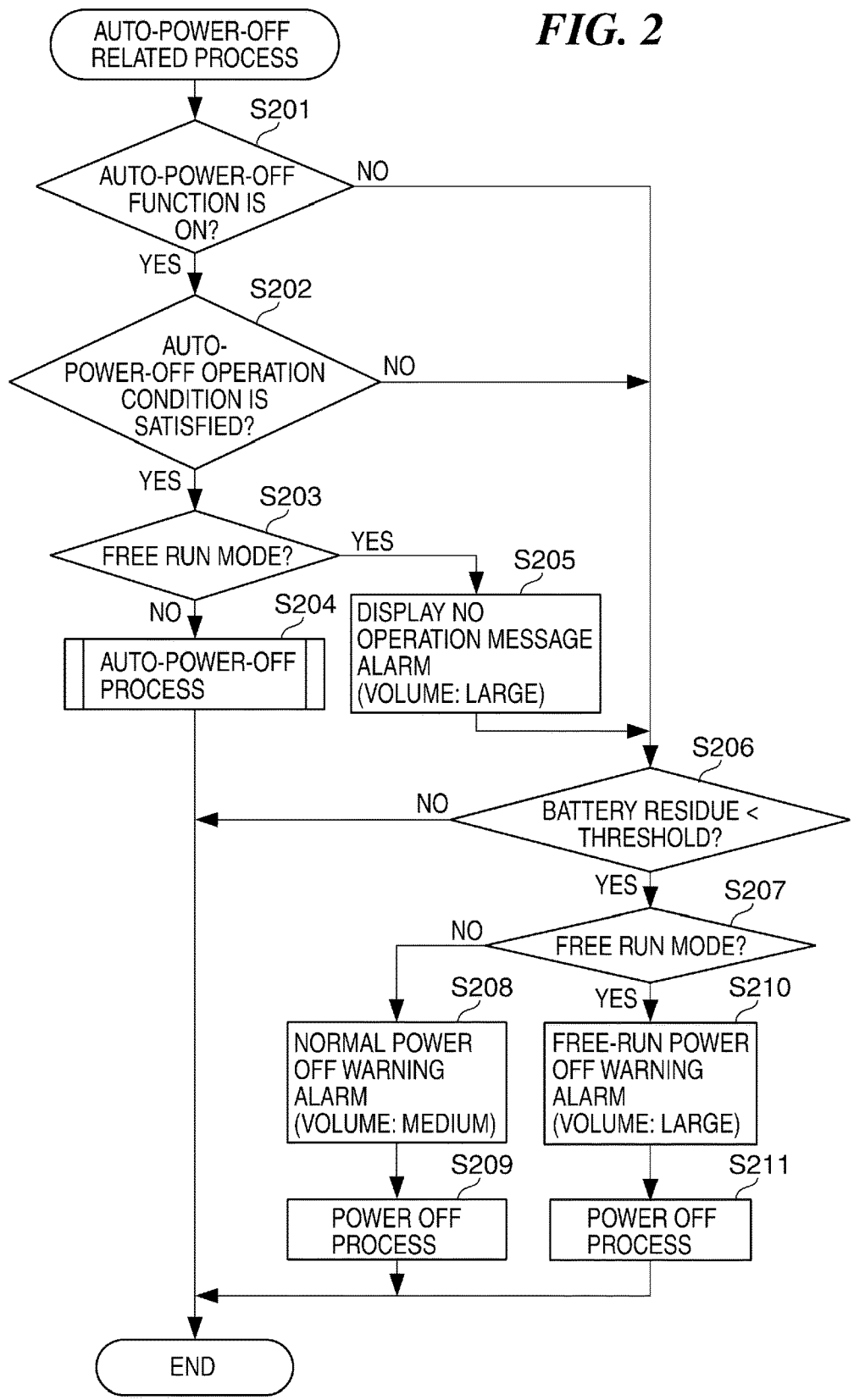
FIG. 2 is a flowchart showing an auto-power-off related process performed by the video camera shown in FIG. 1.

FIG. 2 is a flowchart showing an auto-power-off related process performed by the video camera shown in FIG. 1. This auto-power-off related process is performed, when the program recorded in the ROM 18 is read to the RAM 19 and the control unit 10 runs the program concerned. In the power ON state, this auto-power-off related process is periodically performed by the control unit 10.

When the auto-power-off related process is started, the control unit 10 determines whether an auto-power-off function is valid (ON) with reference to the setting information recorded in the ROM 18 (S201). It should be noted that a user is able to set up validity or invalidity of the auto-power-off function beforehand through the operation unit 17.

When the auto-power-off function is ON (YES in S201), the control unit 10 determines whether an auto-power-off operation condition is satisfied (S202).

As the auto-power-off operation condition, a condition where no recording processes for a video image (moving image) and a static image are in operation and a user's operation is not input within a predetermined period is used, for example. That is, the control unit 10 does not perform the auto power off during photographing and recording of a video image even when a user's operation is not input within the predetermined period.

When the auto-power-off operation condition is satisfied (YES in S202), the control unit 10 determines whether what is called a free run mode is set up as a count method (count mode) for a time code (S203). It should be noted that the user is able to set the time-code-count method as a rec run mode or a free run mode beforehand. The setting method of the time-code count method will be mentioned later.

When the time-code-count method is not the free run mode (NO in S203), the control unit 10 performs the auto-power-off process of the video camera 100 (S204). Then, the control unit 10 finishes the auto-power-off related process. It should be noted that the auto-power-off process will be mentioned later.

Even in the video image taking mode, when the above-mentioned auto-power-off operation condition is satisfied under the condition where the video image is not recording and the count method is not the free run mode, the control unit 10 performs the auto-power-off process.

When the time-code-count method is the free run mode (YES in S203), the control unit 10 displays an effect that there was no user's operation within the predetermined period on the display unit 16 (for example, a message of "there is no operation within the predetermined period" is displayed), and gives an alarm at a "large" sound volume by the sound generation unit 232 (S205). Then, the control unit 10 proceeds with the process to S206 mentioned later.

This makes a user recognize that the absence of the auto-power-off process under the condition where the video image is not recording and no-operation period exceeds the predetermined period (i.e., the auto-power-off operation condition is satisfied) is not malfunction. Moreover, when the free run mode has been set without a user's intention, the user is able to know the setting of the free run mode easily.

This enables the user to turn OFF the setting of the free run mode (to switch to the rec run mode or to switch to the setting not to count the time code) or to turn OFF the power manually, which prevents wasteful consumption of the battery.

When there is no operation within the predetermined period, the user may not be watching the display unit 16 because the user is not near the video camera 100. Accordingly, the alarm is given in the large sound volume so that the user at a position that is not near the video camera 100 knows the setting of the free run mode in the illustrated example.

Subsequently, the control unit 10 determines whether battery residue is less than a predetermined threshold (S206, i.e., whether the voltage of the electric power source unit 22 is less than a predetermined threshold). When the auto-power-off function is OFF (NO in S201), the control unit 10 proceeds with the process to S206. Moreover, when the auto-power-off operation condition is not satisfied (NO in S202), the control unit 10 proceeds with the process to S206.

When the battery residue is equal to or more than the predetermined threshold (NO in S206), the control unit 10 finishes the auto-power-off related process. On the other hand, when the battery residue is less than the predetermined threshold (YES in S206), the control unit 10 determines whether the free run mode has been set up as the time-code-count method (S207).

When the free run mode is not set up as the time-code-count method (NO in S207), the control unit 10 performs a normal power OFF warning (residue lowering warning) within a predetermined period (for example, 5 seconds) (S208). This warning informs the user that the battery residue ran short (or the battery residue became empty), and notifies the user of the power OFF due to degradation of the power supply voltage.

When the normal power OFF warning is performed, a message of "Power turns OFF because battery residue ran short", for example, is displayed on the display unit 16, and a red icon showing the battery residue is highlighted by displaying largely or blinking. Furthermore, the control unit 10 gives an alarm at a "medium" sound volume with the sound generation unit 23.

When AC power etc. that is other than the battery is connected to the video camera 100 to supply electric power during the normal power OFF warning, the user avoids the power OFF due to degradation of the battery residue, and is able to use the video camera 100 in the power ON state continuously.

After performing the normal power OFF warning within the predetermined period, the control unit 10 turns OFF the power of the video camera 100 (S209). When the power is turned OFF, the low-frequency-signal generation circuit 14 performs the clock process at the low frequency as mentioned above. Then, the control unit 10 finishes the auto-power-off related process.

When the free run mode is set up as the time-code-count method (YES in S207), the control unit 10 performs a free-run power OFF warning (residue lowering warning) within a predetermined period (for example, 5 seconds) (S210). This warning informs the user that the battery residue ran short (or the battery residue became empty), and notifies the user of the power OFF due to degradation of the battery residue.

When the free-run power OFF warning is performed, a message of "Power turns OFF because battery residue ran short", for example, is displayed on the display unit 16. Furthermore, the red icon showing the battery residue is highlighted by displaying largely or blinking.

However, since the power OFF in the free run mode may cause error in the count, it is necessary to inform the user of the power OFF certainly to make the user recognize it. Accordingly, the free-run power OFF warning is emphasized as compared with the normal power OFF warning. Then, the control unit 10 increases the sound volume of the alarm of the free-run power OFF warning as compared with that of the normal power OFF warning. That is, the control unit 10 gives the alarm at the "large" sound volume.

When the user connects the AC power etc. that is other than the battery to the video camera 100 to supply electric power during the free-run power OFF warning, the user avoids the power OFF due to degradation of the battery residue, and is able to use the video camera 100 in the power ON state continuously. Accordingly, if the user desires continuation of the exact count in the free run mode, the free-run power OFF warning is effective to urge the user to act so that the power is not turned OFF.

The above-mentioned free-run power OFF warning (residue lowering warning) may be performed at a timing that is earlier than the normal power OFF warning. In this case, the threshold (second threshold) of the battery residue used when determining whether the free-run power OFF warning is performed is set to be larger than the threshold (first threshold) of the battery residue used when determining whether the normal power OFF warning is performed.

After performing the free-run power OFF warning within the predetermined period, the control unit 10 turns OFF the power of the video camera 100 (S211). After that, the control unit 10 finishes the auto-power-off related process.

When the power is turned OFF, the low-frequency-signal generation circuit 14 performs the clock process at the low frequency as mentioned above. Then, the clock process result at the low frequency will be reflected by adding it to the count value by the free run at the time of next power ON. That is, the count by the free run advances without stopping (the count by the free run continues). Since the count accuracy by the free run at the low frequency is lower than that at the high frequency during the power ON, error may occur in a frame unit.

The auto-power-off related process shown in FIG. 2 is repeatedly performed at predetermined intervals when the power of the video camera 10 is ON.

FIG. 3 is a flowchart showing the auto-power-off process executed in the step S204 in FIG. 2.

When the auto-power-off process is started, the control unit 10 performs the auto-power-off warning first (S301). In the auto-power-off warning concerned, the control unit 10 displays a message of "Auto power off will be performed" on the display unit 16, for example. Furthermore, the control unit 10 gives an alarm at the "medium" sound volume with the sound generation unit 23. Since the auto-power-off warning is performed when no operation is given in a predetermined period, the sound warning (alarm) is performed in consideration of a possibility that the user is not looking at the display unit 16.

Subsequently, the control unit 10 starts to clock a preset warning period (for example, 4 seconds) with a built-in warning-period timer (S302). Then, the control unit 10 determines whether the above-mentioned warning period expires (S303).

When the warning period does not expire (NO in S303), the control unit 10 waits. On the other hand, when the warning period expires (YES in S303), the control unit 10 turns off the power of the video camera 100 (S304). When the power is turned OFF, the low-frequency-signal generation circuit 14 performs the clock process at the low frequency as mentioned above. Then, the control unit 10 finishes the auto-power-off process.

When the user gives some operation before the warning period of the auto-power-off warning expires, the control unit 10 finishes the auto-power-off process without performing the power OFF process in S304. That is, the user is able to avoid the auto power off by giving some operations before the warning period of the auto-power-off warning expires.

Figure 4A:
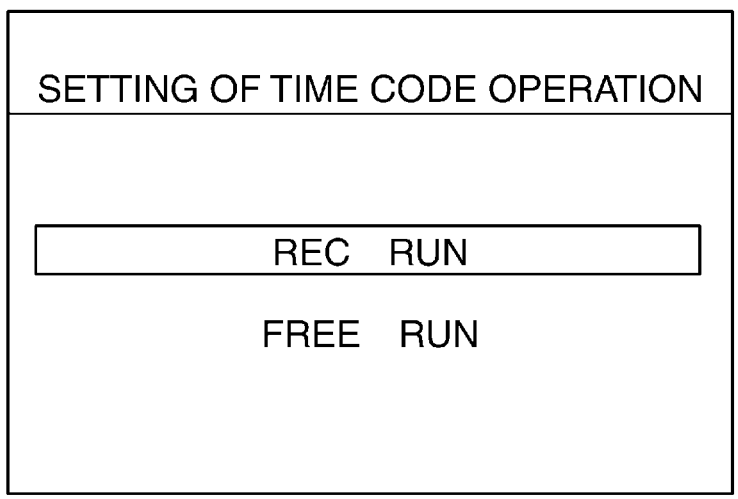
FIG. 4A and FIG. 4B are views showing examples of a menu setting screen for selecting a time-code-count method in the video camera shown in FIG. 1.
Figure 4B:
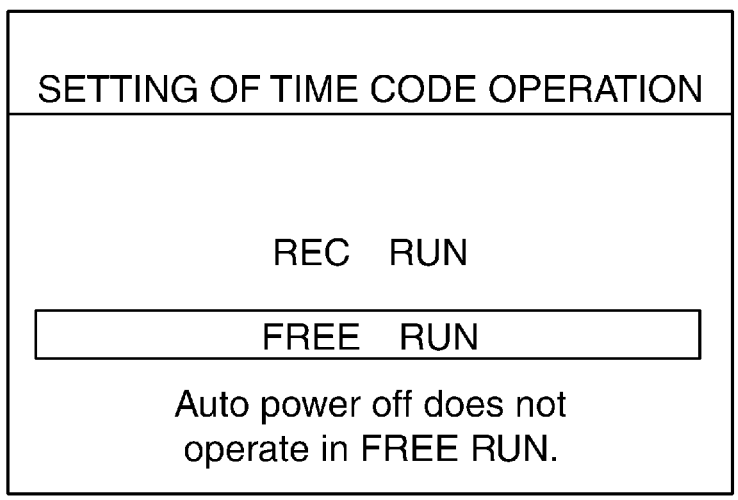

FIG. 4A and FIG. 4B are views showing examples of a menu setting screen (time code operation setting screen) for selecting a time-code-count method in the video camera shown in FIG. 1. Then, FIG. 4A shows a state where the rec run mode (REC RUN) is selected in the menu setting screen, and FIG. 4B shows a state where the free run mode (FREE RUN) is selected in the menu setting screen.

In the illustrated example, there are two modes that can be selected as the time-code-count method (count mode). In this case, there are the rec run mode (REC RUN) and the free run mode (FREE RUN) as the count mode.

In the menu setting screen (time code operation setting screen) shown in FIG. 4A, the column of the rec run mode is selected in the time code operation setting. When the user selects the rec run mode and presses a set button (not shown) as a determining operation, the control unit 10 records the rec run mode as the time code operation (i.e., the count mode) into the ROM 18.

In the rec run mode, the time code advances (i.e., counts) only when an image is recording. Then, in the rec run mode, the control unit 10 records the time code for every frame counted in the rec run mode to the video image as metadata.

In the time code operation setting screen shown in FIG. 4B, the column of the free run mode is selected in the time code operation setting. When the free run mode is selected, the control unit 10 displays a sentence of "Auto power off does not operate in FREE RUN" in the time code operation setting screen, for example. When the user selects the free run mode and presses the set button as the determining operation, the control unit 10 records the free run mode as the time code operation into the ROM 18.

In the free run mode, the time code always advances also including a period during which the video image is not recorded (other than the recording period). When the free run mode is used, the video camera 100 is able to match the start timing with another video camera that takes simultaneously and to unify the time axes. Furthermore, since each frame of the video image taken with one video camera is discriminated individually, convenience at the time of editing is improved.

In the free run mode, the control unit 10 records the time code for every frame counted in the free run mode to the video image as metadata.

When the free run mode is set up, the control unit 10 sets the auto-power-off function to OFF compulsorily. Accordingly, as shown in FIG. 4B, the control unit 10 displays the message of "Auto power off does not operate in FREE RUN" as warning notification for the user. As a result of this, when the free run mode is set up, the user recognizes beforehand that the auto-power-off is not performed (i.e., the battery is consumed even if it is left without an operation).

Thus, in the first embodiment of the present invention, even if the predetermined auto-power-off operation condition is satisfied, the power OFF control is not performed when the free run mode is set up as the time-code count mode. As a result of this, the error caused in the time code is reduced even if the auto-power-off function is ON.

Subsequently, an example of a video camera according to a second embodiment of the present invention will be described. It should be noted that the configuration of the video camera of the second embodiment is the same as the video camera shown in FIG. 1.

In the above-mentioned first embodiment, the example that enables to set ON or OFF of the auto-power-off function is described. On the other hand, in the second embodiment, a first setting in which the auto-power-off function is always ON, a second setting in which the auto-power-off function is OFF only in the free run mode, and a third setting in which the auto-power-off function is always OFF are selectable.

Figure 5:
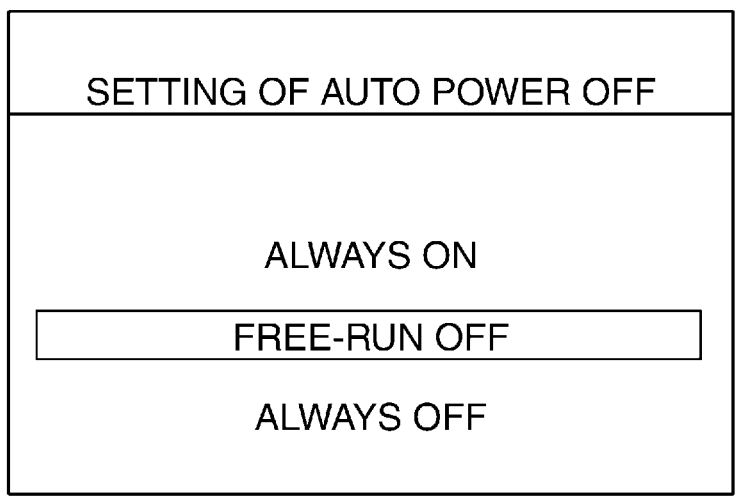
FIG. 5 is a view showing an example of a menu setting screen about auto power off in a video camera according to a second embodiment of the present invention.

FIG. 5 is a view showing an example of a menu setting screen about auto-power-off (an auto-power-off setting screen) in the video camera according to the second embodiment of the present invention.

In the illustrated auto-power-off setting screen, the setting of the auto power off is selectable from among the three modes. A first auto-power-off mode (the first setting) is an always-ON mode. In this always-ON mode, the control unit 10 always performs the auto-power-off process irrespective of the setting of the time-code count mode.

A second auto-power-off mode (the second setting) is a free-run OFF mode. In this free-run OFF mode, when the time-code count mode is set in the free run mode, the control unit 10 sets the auto-power-off function to OFF. That is, in the free-run OFF mode, the control unit 10 disables the auto-power-off process, when the time-code count mode is set to the free run mode.

A third auto-power-off mode (the third setting) is an always-OFF mode. In this always-OFF mode, the control unit 10 always disables the auto-power-off process. Irrespective of whether the time-code count mode is set to the free run mode, the control unit 10 does not perform the auto-power-off process, even if the above-mentioned auto-power-off operation condition is satisfied.

The control unit 10 records the auto-power-off mode set up by a user's operation on the auto-power-off setting screen into the ROM 18 as setting information.

Figure 6:
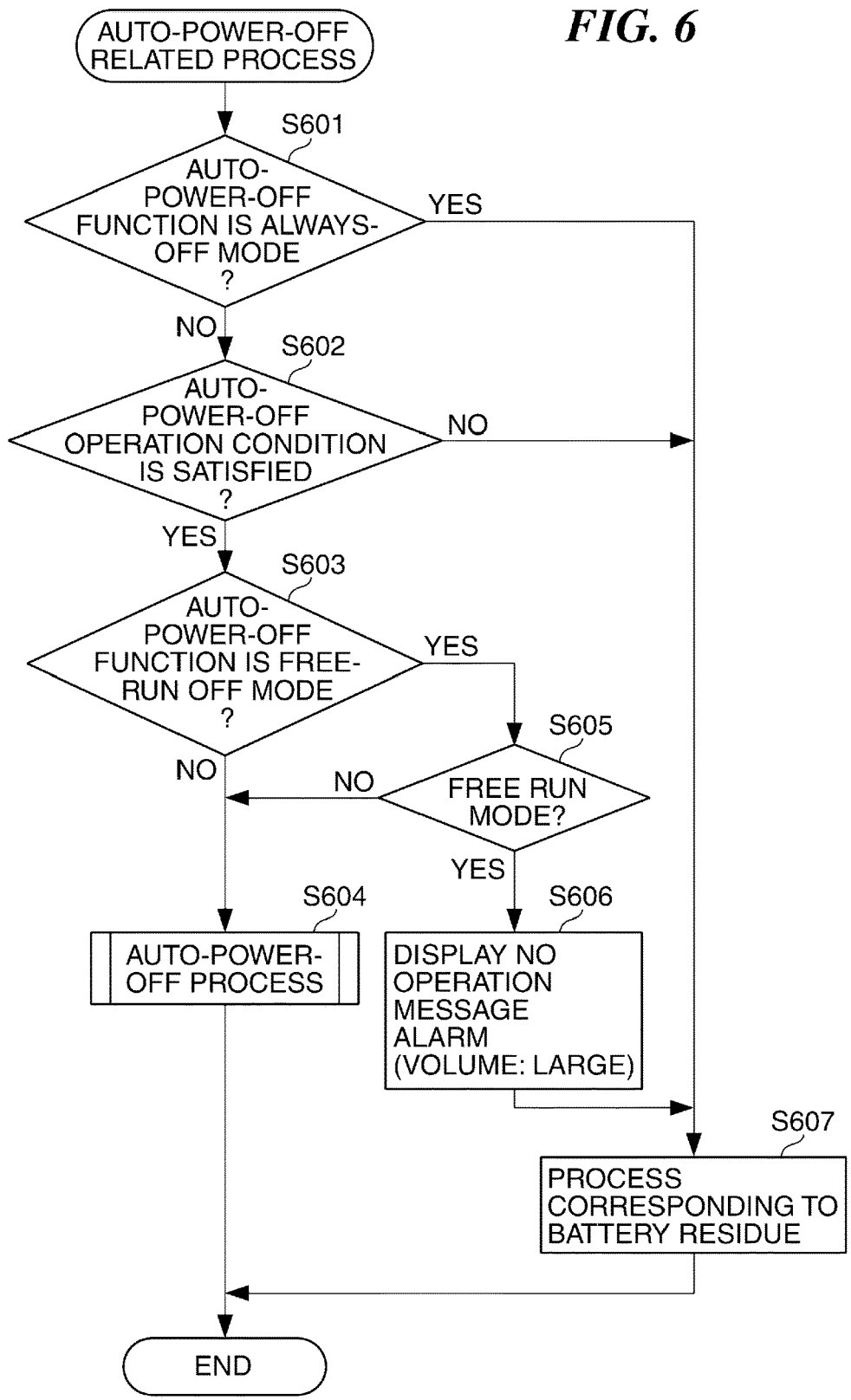
FIG. 6 is a flowchart showing an auto-power-off related process performed with the video camera according to the second embodiment of the present invention.

FIG. 6 is a flowchart showing an auto-power-off related process performed with the video camera according to the second embodiment of the present invention.

It should be noted that the process concerning the illustrated flowchart is performed when the control unit 10 reads a program recorded in the ROM 18 to the RAM 19 and performs the program. Then, this process is repeated by the control unit 10 in predetermined intervals.

When the auto-power-off related process is started, the control unit 10 determines whether the "always-OFF mode" is set about the auto-power-off function with reference to the setting information recorded in the ROM 18 (S601). When the "always-OFF mode" is not set up (NO in S601), the control unit 10 determines whether the auto-power-off operation condition is satisfied as with the above-mentioned process in S202 (S602).

When the auto-power-off operation condition is satisfied (YES in S602), the control unit 10 determines whether the "free-run OFF mode" is set up about the auto-power-off function with reference to the setting information recorded in the ROM 18 (S603).

When the "free-run OFF mode" is not set up (NO in S603, i.e., when the "always-ON mode" is set up), the control unit 10 performs the auto-power-off process (S604). Then, the control unit 10 finishes the auto-power-off related process. It should be noted that the auto-power-off process performed in S604 is the same as that of the auto-power-off process shown in FIG. 3.

Thus, when the "always-ON mode" is set up and when the auto-power-off operation condition is satisfied, the control unit 10 performs the auto-power-off process even if the count mode is set to the free run mode.

When the "free-run OFF mode" is set up (YES in S603), the control unit 10 determines whether the free run mode is set up as the time-code count mode (S605) as with the above-mentioned process in S203. When the count mode is not the free run mode (NO in S605), the control unit 10 proceeds with the process to S604.

On the other hand, when the count mode is the free run mode (YES in S605), the control unit 10 displays an effect that there was no user's operation within the predetermined period on the display unit 16, and gives an alarm at the "large" sound volume by the sound generation unit 232 (S606) as with the above-mentioned process in S205. After that, the control unit 10 performs a process corresponding to the battery residue (S607). Then, the control unit 10 finishes the auto-power-off related process. It should be noted that the process in S607 is the same as the process in S206 through S211 shown in FIG. 2.

Moreover, when the "always-OFF mode" is set up (YES in S601), the control unit 10 proceeds with the process to S607. Moreover, when the auto-power-off operation condition is not satisfied (NO in S602), the control unit 10 proceeds with the process to S607.

Thus, in the second embodiment of the present invention, even if the predetermined auto-power-off operation condition is satisfied, the power OFF control is not performed when the free run mode is set up as the time-code count mode. As a result of this, the error caused in the time code is reduced even if the auto-power-off function is ON.

As is clear from the above description, the control unit 10 and the operation unit 17 function as a setting unit and an auto-power-off setting unit in the example shown in FIG. 1. Furthermore, the control unit 10, the display unit 16, and the sound generation unit 232 function as a first notification unit, a second notification unit, and a warning unit.

It should be noted that the control unit 10 may be one hardware device and may consist of a plurality of hardware devices that share the process to control the entire apparatus.

Although the embodiments of the invention have been described, the present invention is not limited to the above-mentioned embodiments, the present invention includes various modifications as long as the concept of the invention is not deviated. The embodiments mentioned above show examples of the present invention, and it is possible to combine the embodiments suitably.

Although the present invention is applied to the image pickup apparatus, such as the video camera 100, in the embodiments mentioned above, the scope of the present invention is not limited to the embodiments. The present invention is also applicable to a video recording apparatus that is able to give a time code to a video image to be recorded. That is, the present invention is applicable to not only various image pickup apparatuses that take video images, but also an apparatus that records a video image (for example, a video image of television broadcasting, and a video image received from an external device through wired or wireless communication) that is not taken by itself. Accordingly, the present invention is applicable to a personal computer, PDA, cell phone, portable image viewer, game machine, electronic-book reader, hard disc recorder, DVD recorder, and Blu-ray (registered trademark) recorder, etc.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-107582, filed May 27, 2015, which is hereby incorporated by reference herein in its entirety.

What is claimed is:

1. A video recording apparatus comprising:
a high-precision-signal generation circuit that generates a highly accurate clock that is used to count for clocking when power is ON;
a low-frequency-signal generation circuit that generates a low frequency clock for counting by performing an oscillation operation at a frequency that is lower than the frequency of the high-precision-signal generation circuit when the power is OFF;
one or more processors; and
a memory having stored thereon instructions which, when executed by the one or more processors, cause the video recording apparatus to:
set a count method by which a time code given to a video image is counted by selecting from among a plurality of count methods including a free run mode in which the time code is counted regardless of whether a video image is recording;
control so as to perform auto power off to turn off power when a mode other than the free run mode is set and when a predetermined condition, which includes a condition where there is no user's operation within a predetermined period, is satisfied; and
control so as not to turn off the power even when the predetermined condition is satisfied when the free run mode is set.

2. The video recording apparatus according to claim 1, wherein the power is turned off even in a mode for taking a video image when the predetermined condition is satisfied and when a mode other than the free run mode is set.

3. The video recording apparatus according to claim 1, wherein the instructions, when executed by the one or more processors, further cause the video recording apparatus to give warning notification when the free run mode is set and when the predetermined condition is satisfied.

4. The video recording apparatus according to claim 3, wherein the warning notification shows that the free run mode is set.

5. The video recording apparatus according to claim 3, wherein the warning notification shows that the auto power off is not performed.

6. The video recording apparatus according to claim 1, wherein the instructions, when executed by the one or more processors, further cause the video recording apparatus to notify a user that the auto power off is not performed in the free run mode when the count method is set.

7. The video recording apparatus according to claim 1, wherein the instructions, when executed by the one or more processors, further cause the video recording apparatus to perform a clock process according to the low frequency clock when the power is OFF.

8. The video recording apparatus according to claim 1, wherein the instructions, when executed by the one or more processors, further cause the video recording apparatus to set whether the auto power off is performed, and
wherein the auto power off is not performed even when the predetermined condition is satisfied and when a mode other than the free run mode is set, when it is set that the auto power off is not performed.

9. The video recording apparatus according to claim 8, wherein the instructions, when executed by the one or more processors, further cause the video recording apparatus to select one setting from among a first setting that performs the auto power off irrespective of whether the free run mode is set, a second setting that does not perform the auto power off in the free run mode, and a third setting that does not perform the auto power off irrespective of whether the free run mode is set, and
wherein the auto power off is performed even when the free run mode is set, when the predetermined condition is satisfied and when the first setting is selected.

10. The video recording apparatus according to claim 9, wherein the auto power off is not performed even when the predetermined condition is satisfied and when a mode other than the free run mode is set, when the third setting is selected.

11. The video recording apparatus according to claim 1, wherein the plurality of count methods that are set include a rec run mode in which the time code is counted only when a video image is recording.

12. The video recording apparatus according to claim 1, wherein the instructions, when executed by the one or more processors, further cause the video recording apparatus to warn a user when battery residue is less than a predetermined threshold, and
wherein the user is warned at a large sound volume when the free run mode is set and the user is warned at a small sound volume when a mode other than the free run mode is set.

13. The video recording apparatus according to claim 1, wherein the instructions, when executed by the one or more processors, further cause the video recording apparatus to warn a user when battery residue is less than a predetermined threshold, and
wherein a first threshold is used as the predetermined threshold when a mode other than the free run mode is set, and a second threshold that is larger than the first threshold is used as the predetermined threshold when the free run mode is set.

14. A control method for a video recording apparatus, the control method comprising:
generating a highly accurate clock that is used to count for clocking when power is ON;
generating a low frequency clock for counting by performing an oscillation operation at a frequency that is lower than the frequency of the highly accurate clock when the power is OFF;
setting a count method by which a time code given to a video image is counted by selecting from among a plurality of count methods including a free run mode in which the time code is counted regardless of whether a video image is recording; and
controlling so as to perform auto power off to turn off power when a mode other than the free run mode is set and when a predetermined condition, which includes a condition where there is no user's operation within a predetermined period, is satisfied, and controlling so as not to turn off the power even when the predetermined condition is satisfied when the free run mode is set.

15. A non-transitory computer-readable storage medium storing a control program, which when executed by a computer, causes the computer to execute a control method for a video recording apparatus, the control method comprising:

generating a highly accurate clock that is used to count for clocking when power is ON;

generating a low frequency clock for counting by performing an oscillation operation at a frequency that is lower than the frequency of the highly accurate clock when the power is OFF;

setting a count method by which a time code given to a video image is counted by selecting from among a plurality of count methods including a free run mode in which the time code is counted regardless of whether a video image is recording; and controlling so as to perform auto power off to turn off power when a mode other than the free run mode is set and when a predetermined condition, which includes a condition where there is no user's operation within a predetermined period, is satisfied; and controlling so as not to turn off the power even when the predetermined condition is satisfied when the free run mode is set.

16. A video recording apparatus comprising:
one or more processors; and
a memory having stored thereon instructions which, when executed by the one or more processors, cause the video recording apparatus to:
set a count method by which a time code given to a video image is counted by selecting from among a plurality of count methods including a free run mode in which the time code is counted regardless of whether a video image is recording;
control so as to perform auto power off to turn off power when a mode other than the free run mode is set and when a predetermined condition, which includes a condition where there is no user's operation within a predetermined period, is satisfied, and control so as not to turn off the power even when the predetermined condition is satisfied when the free run mode is set; and
set whether the auto power off is performed,
wherein the auto power off is not performed even when the predetermined condition is satisfied and when a mode other than the free run mode is set, when it is set that the auto power off is not performed.

17. The video recording apparatus according to claim 16, wherein the instructions, when executed by the one or more processors, further cause the video recording apparatus to select one setting from among a first setting that performs the auto power off irrespective of whether the free run mode is set, a second setting that does not perform the auto power off in the free run mode, and a third setting that does not perform the auto power off irrespective of whether the free run mode is set, and
wherein the auto power off is performed even when the free run mode is set, when the predetermined condition is satisfied and when the first setting is selected.

18. The video recording apparatus according to claim 17, wherein the auto power off is not performed even when the predetermined condition is satisfied and when a mode other than the free run mode is set, when the third setting is selected.

19. The video recording apparatus according to claim 16, wherein the plurality of count methods that are set include a rec run mode in which the time code is counted only when a video image is recording.

20. A control method for a video recording apparatus, the control method comprising:
setting a count method by which a time code given to a video image is counted by selecting from among a plurality of count methods including a free run mode in which the time code is counted regardless of whether a video image is recording;

controlling so as to perform auto power off to turn off power when a mode other than the free run mode is set and when a predetermined condition, which includes a condition where there is no user's operation within a predetermined period, is satisfied;

controlling so as not to turn off the power even when the predetermined condition is satisfied when the free run mode is set;

setting so as to set whether the auto power off is performed; and controlling so as not to perform the auto power off even when the predetermined condition is satisfied and when a mode other than the free run mode is set, when it is set that the auto power off is not performed.

21. A non-transitory computer-readable storage medium storing a control program, which when executed by a computer, causes the computer to execute a control method for a video recording apparatus, the control method comprising:
setting a count method by which a time code given to a video image is counted by selecting from among a plurality of count methods including a free run mode in which the time code is counted regardless of whether a video image is recording;

controlling so as to perform auto power off to turn off power when a mode other than the free run mode is set and when a predetermined condition, which includes a condition where there is no user's operation within a predetermined period, is satisfied, and controlling so as not to turn off the power even when the predetermined condition is satisfied when the free run mode is set;

setting so as to set whether the auto power off is performed; and controlling so as not to perform the auto power off even when the predetermined condition is satisfied and when a mode other than the free run mode is set, when it is set that the auto power off is not performed.

22. A video recording apparatus comprising:
one or more processors; and
a memory having stored thereon instructions which, when executed by the one or more processors, cause the video recording apparatus to:
set a count method by which a time code given to a video image is counted by selecting from among a plurality of count methods including a free run mode in which the time code is counted regardless of whether a video image is recording;
control so as to perform auto power off to turn off power when a mode other than the free run mode is set and when a predetermined condition, which includes a condition where there is no user's operation within a predetermined period, is satisfied, and control so as not to turn off the power even when the predetermined condition is satisfied when the free run mode is set; and
warn a user when battery residue is less than a predetermined threshold,
wherein a first threshold is used as the predetermined threshold when a mode other than the free run mode is set, and a second threshold that is larger than the first threshold is used as the predetermined threshold when the free run mode is set.

23. A control method for a video recording apparatus, the control method comprising:

setting a count method by which a time code given to a video image is counted by selecting from among a plurality of count methods including a free run mode in which the time code is counted regardless of whether a video image is recording;

controlling so as to perform auto power off to turn off power when a mode other than the free run mode is set and when a predetermined condition, which includes a condition where there is no user's operation within a predetermined period, is satisfied, and controlling so as not to turn off the power even when the predetermined condition is satisfied when the free run mode is set; and warning so as to warn a user when battery residue is less than a predetermined threshold, wherein a first threshold is used as the predetermined threshold when a mode other than the free run mode is set, and a second threshold that is larger than the first threshold is used as the predetermined threshold when the free run mode is set.

24. A non-transitory computer-readable storage medium storing a control program, which when executed by a computer, causes the computer to execute a control method for a video recording apparatus, the control method comprising:

setting a count method by which a time code given to a video image is counted by selecting from among a plurality of count methods including a free run mode in which the time code is counted regardless of whether a video image is recording;

controlling so as to perform auto power off to turn off power when a mode other than the free run mode is set and when a predetermined condition, which includes a condition where there is no user's operation within a predetermined period, is satisfied, and controlling so as not to turn off the power even when the predetermined condition is satisfied when the free run mode is set; and warning a user when battery residue is less than a predetermined threshold, wherein a first threshold is used as the predetermined threshold when a mode other than the free run mode is set, and a second threshold that is larger than the first threshold is used as the predetermined threshold when the free run mode is set.

* * * * *